(12) United States Patent
Charleux et al.

(10) Patent No.: US 12,377,685 B2
(45) Date of Patent: Aug. 5, 2025

(54) TIRE FABRIC COMPRISING TOUSLED WEFT REINFORCING ELEMENTS WITH LOW MOISTURE ABSORPTION CONTENT

(71) Applicant: COMPAGNIE GENERALE DES ETABLISSEMENTS MICHELIN, Clermont-Ferrand (FR)

(72) Inventors: Damien Charleux, Clermont-Ferrand (FR); Arnaud Delbast, Clermont-Ferrand (FR); Laure Gallard, Clermont-Ferrand (FR); Christophe Goarant, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 18/271,335

(22) PCT Filed: Jan. 3, 2022

(86) PCT No.: PCT/FR2022/050001
§ 371 (c)(1),
(2) Date: Jul. 7, 2023

(87) PCT Pub. No.: WO2022/148920
PCT Pub. Date: Jul. 14, 2022

(65) Prior Publication Data
US 2024/0066925 A1   Feb. 29, 2024

(30) Foreign Application Priority Data
Jan. 7, 2021   (FR) ...................................... 2100103

(51) Int. Cl.
*B60C 9/00* (2006.01)
*B60C 9/18* (2006.01)
(Continued)

(52) U.S. Cl.
CPC .......... *B60C 9/0042* (2013.01); *B60C 9/1807* (2013.01); *D03D 1/00* (2013.01);
(Continued)

(58) Field of Classification Search
None
See application file for complete search history.

(56) References Cited

U.S. PATENT DOCUMENTS

2010/0275567 A1* 11/2010 Hsu ........................ D02G 3/367
57/244
2013/0034718 A1    2/2013 Nair et al.
(Continued)

FOREIGN PATENT DOCUMENTS

WO    2012/063180 A1    5/2012
WO    2015/016791 A1    2/2015
(Continued)

OTHER PUBLICATIONS

International Search Report dated Apr. 8, 2022, in corresponding PCT/FR2022/050001 (4 pages).

*Primary Examiner* — Arti Singh-Pandey
(74) *Attorney, Agent, or Firm* — VENABLE LLP

(57) ABSTRACT

A weft fabric (T) for tires (10) comprises several textile warp reinforcing elements (44) and several weft reinforcing elements (50), wherein the moisture regain MR of the weft reinforcing elements (50) is less than or equal to 2.0%, the moisture regain being determined according to standard ASTM D 885/D 885MA of January 2010 the weft reinforcing elements (50) interweave the warp reinforcing elements (44), and the weft reinforcing elements (50) are hairy.

15 Claims, 6 Drawing Sheets

(51) Int. Cl.
*D03D 1/00* (2006.01)
*D03D 15/283* (2021.01)
*D03D 15/47* (2021.01)
*D03D 15/49* (2021.01)
*D03D 15/50* (2021.01)

(52) U.S. Cl.
CPC ........... *D03D 15/283* (2021.01); *D03D 15/47* (2021.01); *D03D 15/49* (2021.01); *D03D 15/50* (2021.01); *B60C 2009/0071* (2013.01); *B60C 2009/1814* (2013.01); *D10B 2331/02* (2013.01); *D10B 2331/04* (2013.01); *D10B 2401/02* (2013.01); *D10B 2505/022* (2013.01)

(56) References Cited

U.S. PATENT DOCUMENTS

2016/0272755 A1* 9/2016 Yu .................... C08G 63/916
2017/0072747 A1    3/2017 Aksoy et al.
2017/0174006 A1    6/2017 Michoud et al.

FOREIGN PATENT DOCUMENTS

WO    2015/118041 A1    8/2015
WO    2018/203852 A1    11/2018

\* cited by examiner

TIRE FABRIC COMPRISING TOUSLED WEFT REINFORCING ELEMENTS WITH LOW MOISTURE ABSORPTION CONTENT

BACKGROUND

The present invention relates to a tyre fabric comprising warp reinforcing elements and weft reinforcing elements. The invention also relates to an elastomer composite comprising this fabric and to a tyre comprising a hooping ply obtained from this composite. The invention also relates to a process for weaving this fabric.

A fabric for a tyre intended to be fitted to passenger vehicles sold under the Michelin brand and forming part of the Primacy 4 range is known from the prior art, said tyre having the following size characteristics: 225/45R17 94W XL TL. Such a tyre comprises a tread and a hoop reinforcement extending in the crown in a circumferential direction of the tyre. The hoop reinforcement comprises a hooping ply comprising several reinforcing elements arranged side-by-side substantially parallel to one another and forming an angle less than or equal to 10° with the circumferential direction of the tyre.

Such a tyre from the prior art comprises a hooping ply comprising a weft fabric comprising warp reinforcing elements comprising an assembly consisting of two multifilament strands made of nylon, the two strands being wound in a helix around one another at a twist of 250 turns per metre. Each multifilament strand has a count equal to 140 tex and weft reinforcing elements comprising a natural cotton fibre having a twist of 750 turns per meter and having a count equal to 30 tex. The weft fabric is obtained by interweaving warp and weft reinforcing elements using an air-jet loom weaving process. Since each cotton weft element is an assembly of natural fibres, weaving using an air-jet loom is relatively easy due to the hairiness of the material which allows weaving over the entire width of the fabric.

Such a tyre is subjected to numerous attacks. Specifically, this type of tyre can run on a rough road surface, sometimes resulting in perforations of the tread. These perforations allow the entry of corrosive agents, for example air and water, which oxidize the metal reinforcing elements of the crown reinforcement, in particular of the crown plies, and considerably reduce the life of the tyre.

One solution for increasing the life of the tyre is to combat the spread of these corrosive agents. It is thus possible to provide solutions for increasing the life of the tyre. One solution consists in reducing the number of textile reinforcing elements of the hooping crown ply, in order to reduce the storage and spread of water. Another solution would be to increase the thickness of the plies and in particular of the hooping ply to prevent contact between the hooping ply and the working crown plies and thus prevent the spread of corrosive agents.

By reducing the number of textile reinforcing elements, the spread of water in the textile reinforcers is reduced, but the stiffness of the fabric is reduced. This reduction in the stiffness of the fabric leads to a drop in tyre performance for example at high speed, which is obviously not desirable.

By increasing the thickness of the hooping ply, the weight of the tyre is increased, and therefore the rolling resistance of the tyre is increased, which is not desirable.

SUMMARY

The objective of the invention is to find a fabric for the hooping crown ply of a tyre that is industrially efficient and less sensitive to moisture in order to minimize the risks of corrosion and that does not exhibit the abovementioned drawbacks.

DETAILED DESCRIPTION

To this end, one subject of the invention is a weft fabric for tyres comprising several textile warp reinforcing elements and several weft reinforcing elements, wherein
  the moisture regain MR of the weft reinforcing elements is less than or equal to 2.0%, the moisture regain being determined according to standard ASTM D 885/D 885MA of January 2010;
  the weft reinforcing elements interlace the warp reinforcing elements and;
  the weft reinforcing elements are hairy.

A weft reinforcing element comprises several threadlike elements. Each threadlike element is a short fibre and/or a filament.

A hairy weft reinforcing element is understood to mean a reinforcing element comprising threadlike elements protruding from the circle circumscribing a theoretical threadlike reinforcing element corresponding to the weft reinforcing element from which the protruding threadlike elements have been removed.

A hairy weft reinforcing element is understood to mean that the weft reinforcing element is neither smooth nor textured as described in application WO2015016791.

By definition, the diameter of the hairy reinforcing element is the diameter of the circle circumscribing the theoretical threadlike reinforcing element described above.

A weft reinforcing element is understood to mean a reinforcing element placed in the direction of the width of the fabric. The warp reinforcing element is itself positioned in the direction of the length of the fabric. The warp reinforcing element acts as a support for the weft. It is the angled interweaving of these two reinforcing elements that gives the weft fabric.

The term fabric is understood to mean a fabric composed of two sets of warp and weft reinforcing elements which is formed during a weaving step by the interlacing of these reinforcing elements.

The moisture regain of the weft reinforcing elements T×H according to the ASTM D 885/D 885MA standard of January 2010 (paragraph 10) is the ratio of the mass of water contained in the weft reinforcing element to the dry mass of the weft reinforcing element, expressed as a percentage:
  $T \times H = [(W-M)/M] \times 100$ where W is the initial mass of the weft reinforcing element in grams and M is the mass of the subjected weft reinforcing element after oven drying, in grams.

The initial mass of the weft reinforcing element is understood to mean the mass of the weft reinforcing element measured after 48 hours at 23° C.+/−2° C. under 50%+/−10% relative humidity according to the ISO 23529 standard of 2016.

The compounds mentioned in the description may be of fossil origin or may be biobased. In the latter case, they may be partially or completely derived from biomass or may be obtained from renewable starting materials derived from biomass. Similarly, the compounds mentioned may also be derived from the recycling of already-used materials, i.e. they may be partly or totally derived from a recycling process, or obtained from raw materials which are themselves derived from a recycling process. This in particular includes filaments, fibres, polymers, plasticizers, fillers, etc.

The inventors behind the invention demonstrate that by selecting a weft reinforcing element having a low moisture regain, the spread of water in the textile reinforcements is reduced and thus the spread of corrosive agents which oxidize the metal reinforcing elements of the crown reinforcement, in particular of the crown plies, is reduced and the hairy weft reinforcing element has the advantage of being hairy enough to be able to be woven on an air-jet loom and ensure that the warp reinforcing elements are held. The lower the moisture regain of the weft reinforcing element, the more reduced the storage and spread of water within the fabric and the more improved the corrosion resistance in the tyre.

The hairiness is measured using a measuring device for measuring the geometries on the scanned and calibrated images using a lens and systems of lights that make it possible to reveal the structure of the threadlike elements. In a first method for measuring the hairiness for counting the threadlike elements, any threadlike element crossing a line perpendicular to the tangent to the external diameter of the reinforcing element in the direction of the length of the weft reinforcing element is counted. Thus, for 100 metres of weft reinforcing elements, it is thus possible to determine the hairiness of the weft reinforcing element.

Threadlike elements are understood to mean filaments, that is to say continuous fibres or short fibres, i.e. staple fibres.

Preferably, in this first method, the weft reinforcing elements are such that the number of threadlike elements protruding from the diameter of the weft reinforcing element is greater than or equal to 1250 threadlike elements per 100 metres of weft reinforcement, preferably greater than or equal to 5000 threadlike elements per 100 metres of weft reinforcing elements and more preferentially greater than or equal to 7500 threadlike elements per 100 metres of weft reinforcing elements.

A second alternative method for measuring the hairiness can also be carried out using a USTER TESTER 6 sensor which measures the number of threadlike elements protruding from the diameter of the weft reinforcing element which have a size between 1 and 2 mm if a line is plotted perpendicular to the tangent to the external diameter of the reinforcing element in the direction of the length of the weft reinforcing element. Thus, for 100 metres of weft reinforcing elements, it is thus possible to determine the hairiness of the weft reinforcing element.

Preferably, in this second method, the weft reinforcing elements are such that the number of 1 to 2 mm threadlike elements protruding from the diameter of the weft reinforcing element is greater than or equal to 5000 threadlike elements per 100 metres of weft reinforcement, preferably greater than or equal to 6000 threadlike elements per 100 metres of weft reinforcing elements and more preferentially greater than or equal to 7000 threadlike elements per 100 metres of weft reinforcing elements.

Advantageously, the warp reinforcing elements are substantially parallel to one another and extend in a general warp direction (Dwp) and the weft reinforcing elements are substantially parallel to one another and extend in a general direction referred to as weft direction (Dwt) different from the general warp direction (Dwp) with preferably the general weft direction (Dwt) and the general warp direction (Dwp) forming an angle greater than or equal to 45°, and more preferably the angle ranges from 80° to 110°.

In one embodiment, each textile warp reinforcing element comprises a single multifilament strand.

In another embodiment, each textile warp reinforcing element comprises several multifilament strands.

Preferably, in this other embodiment, each warp reinforcing element comprises an assembly consisting of two multifilament strands, the two strands being wound in a helix around one another and, preferably, the reinforcing element is twist-balanced.

An "assembly consisting of" is understood to mean that the assembly comprises no multifilament strand other than the two multifilament strands made of aromatic polyamide or aromatic copolyamide and of polyester.

Twist-balanced is understood to mean that the two multifilament strands are wound with a substantially identical twist and that the twist of the filaments of each multifilament strand, that is to say the twist of the filaments of the multifilament strand of aromatic polyamide or copolyamide and the twist of the filaments of the strand of polyester is substantially zero. Specifically, the method for manufacturing these reinforcing elements, which is well known in the prior art, comprises a first step during which each spun yarn of filaments (more properly referred to as a "yarn") is first of all twisted individually on itself (with an initial twist R1' and R2' with R1'=R2') in a given direction D'=D1'=D2' (the S or Z direction, respectively, according to recognized terminology denoting the orientation of the turns with respect to the crossbar of an S or of a Z) to form a strand or overtwist (more properly referred to as a "strand") in which the filaments are deformed into a helix about the axis of the strand. Then, during a second step, the two strands are then twisted together with a final twist R3 such that R3=R1'=R2' in a direction D3 that is the opposite to the direction D'=D1'=D2' (respectively Z or S direction) to obtain the reinforcing element (more properly referred to as a "cord"). This reinforcing element is then said to be twist-balanced, since the filaments of the two strands exhibit, in the final reinforcing element, the same residual twist, since R1'=R2'. This residual twist is zero or near-zero because R3=R1'=R2' and the direction D'=D1'=D2' is the opposite of the direction D3. The expression "substantially zero residual twist" means that the residual twist is strictly less than 2.5% of the twist R3.

The following features apply to the two above-described embodiments.

Advantageously, the multifilament strand(s) are chosen from polyester strands, aliphatic polyamide strands, strands comprising aromatic polyamides or aromatic copolyamides and strands comprising mixtures of filaments of these materials, preferably chosen from aliphatic polyamide strands and more preferentially strands made of nylon 6.6.

It will be recalled that a polyester strand is a set of filaments consisting of linear macromolecules formed of groups bonded to one another by ester bonds. Polyesters are manufactured by polycondensation, by esterification between a dicarboxylic acid or one of the derivatives thereof, and a diol. For example, polyethylene terephthalate can be manufactured by polycondensation of terephthalic acid and ethylene glycol. Among the known polyesters, mention may be made of polyethylene terephthalate (PET), polyethylene naphthalate (PEN), polybutylene terephthalate (PBT), polybutylene naphthalate (PBN), polypropylene terephthalate (PPT) or polypropylene naphthalate (PPN).

It is recalled that a strand of aromatic polyamide or aromatic copolyamide, as is well known, is a set of filaments consisting of linear macromolecules formed of aromatic groups bonded to one another by amide bonds, at least 85% of which are directly bonded to two aromatic rings, and more particularly of fibres made of poly(p-phenylene terephthalamide) (or PPTA), which have been manufactured for a very long time from optically anisotropic spinning compositions. Among the aromatic polyamides or aromatic copolyamides, mention may be made of polyaryl amides (or PAA, particularly known by the Solvay company trade name Ixef), poly(metaxylylene adipamide), polyphthalamides (or PPA, particularly known by the Solvay company trade name Amodel), amorphous semi-aromatic polyamides (or PA 6-3T, particularly known by the Evonik company trade name Trogamid), meta-aramids (or poly(metaphenylene isophthalamide) or PA MPD-I, particularly known by the Du Pont de Nemours company trade name Nomex) or para-aramids (or poly(paraphenylene terephthalamide) or PA PPD-T, particularly known by the Du Pont de Nemours company trade name Kevlar or the Teijin company trade name Twaron).

A strand of aliphatic polyamide is understood to be a set of filaments consisting of linear macromolecules of polymers or copolymers containing amide functions that do not have aromatic rings and that can be synthesized by polycondensation between a carboxylic acid and an amine. Among the aliphatic polyamides, nylons PA4.6, PA6, PA6.6 or PA6.10, and in particular Zytel from the company DuPont, Technyl from the company Solvay or Rilsamid from the company Arkema may be mentioned.

Advantageously, the count of the aliphatic aliphatic polyamide strand ranges from 70 to 120 tex, preferably from 90 to 110 tex, and more preferably from 90 to 100 tex.

The count (or linear density) of each strand is determined in accordance with the standard ASTM D1423. The count is given in tex (mass in grams of 1000 m of product—as a reminder: 0.111 tex is equal to 1 denier). The density of reinforcing elements in the composite is the number of reinforcing elements included in one decimeter of composite in the direction perpendicular to the direction in which the reinforcing elements run parallel to one another.

Advantageously, the twist of each warp reinforcing element ranges from 100 to 500 turns per metre, preferably from 250 to 390 turns per metre, and even more preferentially 250 to 380 turns per metre.

The twist of the reinforcing element can be measured using any method known to those skilled in the art, for example in accordance with standards ASTM D1423 or ASTM D 885/D 885MA of January 2010 (paragraph 30), for example using a twist tester.

Advantageously, each weft reinforcing element comprises, for at least 50% of its weight, one or more textile filaments and/or several textile fibres and preferably consists of one or more textile filaments and/or several textile fibres.

Textile filaments and fibres are usually classified in two main categories: natural filaments and fibres and chemical filaments and fibres. Natural filaments and fibres include filaments and fibres of plant origin (in particular including cotton), of animal origin and of mineral origin. Chemical filaments and fibres include artificial filaments and fibres and synthetic filaments and fibres. Artificial filaments and fibres are produced from natural raw materials and include in particular viscose, produced from wood cellulose. Synthetic filaments and fibres include organic polymeric (for example polyester and polyamide) filaments and fibres and also inorganic polymeric (for example glass and carbon) filaments and fibres Preferably, each weft reinforcing element comprises at least one strand comprising a core and a layer coating the core, the core comprising at least one filament and the layer comprising several protruding short fibres.

A strand is understood to mean an assembly of several threadlike elements held together with a certain twist.

A filament is a very long, continuous, single element, generally obtained by spinning a molten material. It can be either artificial or synthetic.

A short fibre is understood to mean a staple fibre of reduced length. It can be either natural fibres or chopped filaments.

Advantageously, each weft reinforcing element comprises an assembly of several strands each comprising a core and a layer coating the core, the core comprising at least one filament and the layer comprising several short fibres that protrude and go back in.

More preferentially, each weft reinforcing element comprises an assembly of two strands each comprising a core and a layer coating the core, the core comprising at least one filament and the layer comprising several short fibres that protrude and go back in.

Even more preferentially, each weft reinforcing element consists of an assembly of two strands comprising a core and a layer coating the core, the core comprising at least one filament and the layer comprising several short fibres that protrude and go back in.

An "assembly consisting of" is understood to mean that the assembly comprises no strand other than the two strands mentioned above.

Preferably, the core comprises several synthetic organic polymeric filaments and the layer comprises several synthetic organic polymeric fibres.

preferably, each filament and/or each fibre are selected from polyester filaments and fibres, polyamide filaments and fibres, polyketone filaments and fibres, polyurethane filaments and fibres, acrylic filaments and fibres, polyolefin filaments and fibres, polyether ether ketone filaments and fibres and the assemblies of these filaments and of these fibres, preferably from polyester filaments and fibres, polyamide filaments and fibres and the assemblies of these filaments and of these fibres and more preferentially the synthetic organic filaments and fibres are polyester filaments and fibres.

Advantageously, the sum of the counts of the strands of weft reinforcing elements is strictly less than 40 tex, preferably less than or equal to 30 tex.

Advantageously, the sum of the counts of the strands of weft reinforcing elements is greater than or equal to 2 tex and preferably greater than or equal to 4 tex.

Advantageously, the count of each strand of weft reinforcing element ranges from 1 to 20 tex and preferably from 10 to 15 tex.

Advantageously, the twist of each weft reinforcing element ranges from 250 to 1500 turns per metre, preferably from 500 to 1300 turns per metre, more preferentially from 900 to 1200 turns per metre.

The count and twist are determined by the standards as described previously.

Advantageously, the diameter of each weft reinforcing element is strictly less than 0.50 mm and preferably less than or equal to 0.23 mm. The diameter of each weft reinforcing element is smaller than that of each weft reinforcing element from the prior art in order to reduce the free volume available for water, and therefore reduce the storage and spread of water in the weft fabric.

Advantageously, the density of the weft reinforcing elements ranges from 3.0 to 8.0 weft reinforcing elements per dm of fabric, preferably from 3.0 to 6.0 weft reinforcing elements per dm of fabric and more preferentially from 3.0 to 5.5 weft reinforcing elements per dm of fabric. The fabric length is measured in the general warp direction (Dwp). In the same way as for the diameter, the density of the weft reinforcing elements is smaller than that of the weft reinforcing element from the prior art in order to reduce the free volume available for water, and therefore reduce the spread of water in the weft fabric.

Another subjects of the invention is a composite for a tyre comprising at least one fabric as defined previously, embedded in an elastomer composition.

An elastomer composition is understood to mean a composition comprising an elastomer, preferably a diene elastomer, for example natural rubber, a reinforcing filler, for example carbon black and/or silica, and a crosslinking system, for example a vulcanization system, preferably comprising sulfur.

Preferably, the elastomer composition comprises a diene elastomer.

Another subject of the invention is a tyre comprising a hoop reinforcement comprising at least one hooping ply obtained from an elastomer composite as defined hereinabove.

Preferably, the tyre comprising a hoop reinforcement comprising at least one hooping ply obtained from an elastomer composite as defined hereinabove.

The tyres of the invention in particular may be intended for motor vehicles of the passenger vehicle, 4×4 and SUV (Sport Utility Vehicle) type, but also for two-wheel vehicles, such as motorcycles, or for industrial vehicles such as underground trains, buses, heavy road transport vehicles (vans, lorries, tractors, trailers), off-road vehicles, heavy agricultural vehicles or earthmoving equipment.

For preference, the tyres may be intended for motor vehicles of the passenger vehicle, 4×4 or SUV (Sport Utility Vehicle) type.

Another subject of the invention is a process for manufacturing a tweft fabric, wherein:
in an unwinding step, several warp reinforcing elements are unwound from a creel on an air-jet loom;
in a separation step, the warp reinforcing elements are separated into a first and a second ply of warp reinforcing elements;
in an interweaving step, at least one weft reinforcing element is alternately interwoven with warp reinforcing elements of the first ply of warp reinforcing elements then of the second ply of warp reinforcing elements;
in a winding step, the weft fabric is wound on a storage reel;
wherein, the moisture regain MR of the weft reinforcing elements is less than or equal to 2.0%; the moisture regain being determined according to standard ASTM D 885/D 885MA of January 2010 and;
wherein the weft reinforcing elements are hairy.

Preferably, in a sizing step subsequent to the interweaving step, the weft fabric is impregnated with an adhesive composition.

The adhesive compositions include RFL (Resorcinol-Formaldehyde-Latex) adhesives, but also the adhesive compositions as described in WO2015118041.

BRIEF DESCRIPTION OF THE FIGURES

The invention will be better understood from reading the following description, given solely by way of non-limiting example and with reference to the drawings in which.

When using the term "radial", a distinction should be made between several different uses of the word by a person skilled in the art. Firstly, the expression refers to a radius of the tyre. It is in that sense that a point A is said to be "radially inside" a point B (or "radially on the inside of" the point B) if it is closer to the axis of rotation of the tyre than is the point B. Conversely, a point C is said to be "radially outside" a point D (or "radially on the outside of" the point D) if it is further from the axis of rotation of the tyre than is the point D. Progress "radially inwards (or outwards)" will mean progress towards smaller (or larger) radii. This sense of the term also applies when it is a matter of radial distances.

A "radial cross section" or "radial section" is understood herein to be a cross section or a section in a plane that contains the axis of rotation of the tyre.

The "median circumferential plane" M of the tyre is the plane that is normal to the axis of rotation of the tyre and which is situated equidistantly from the annular reinforcing structures of each bead.

The "median tangential plane" TT of the tyre is the plane which is perpendicular to the "median circumferential plane" M.

An "axial" direction is a direction parallel to the axis of rotation of the tyre.

A "circumferential" direction is a direction that is perpendicular both to a radius of the tyre and to the axial direction.

Example of a Tyre According to the Invention

A frame of reference X, Y, Z corresponding to the usual respectively axial (X), radial (Y) and circumferential (Z) directions of a tyre is shown in the figures.

Figure 1:
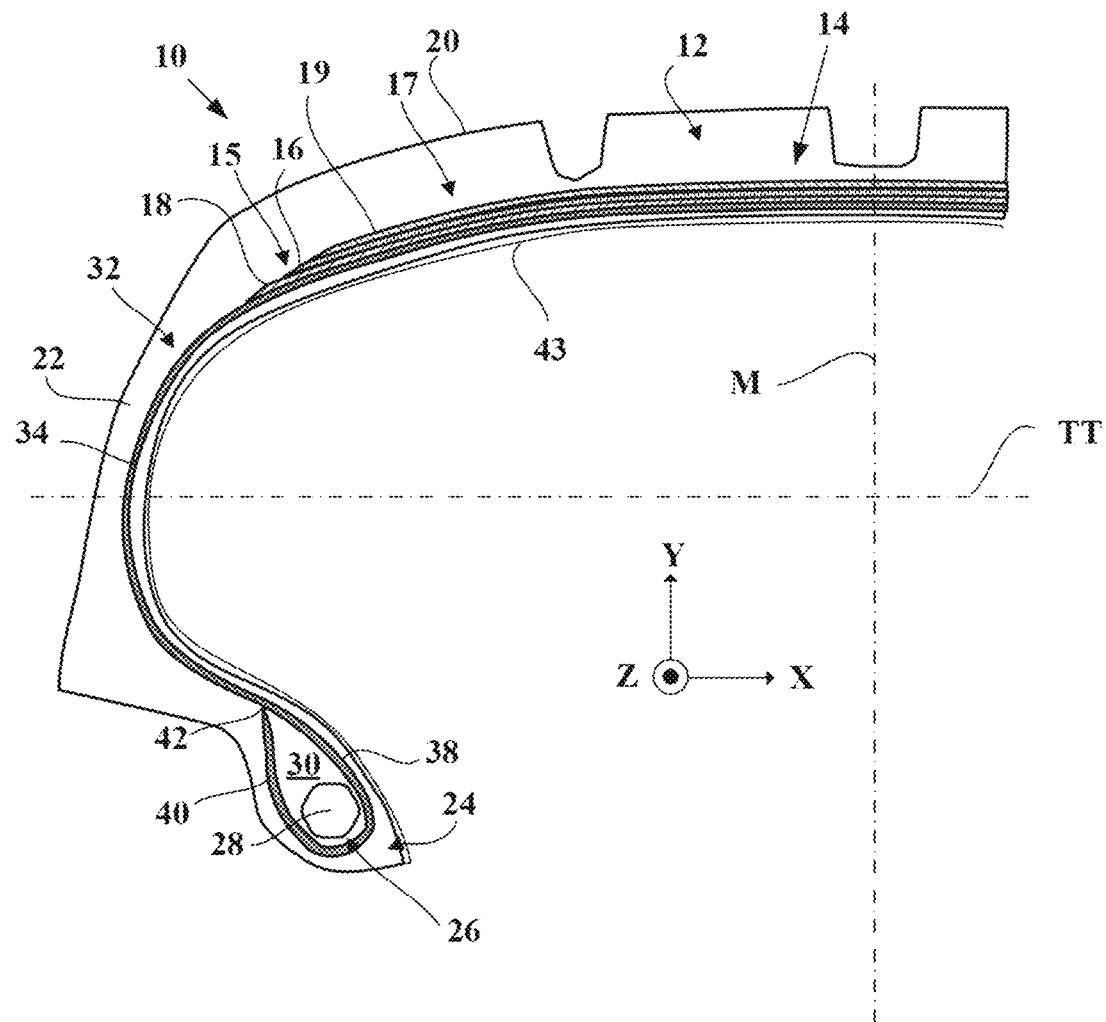
FIG. 1 is a view, in a meridian section plane, of a tyre 10 according to the invention.

FIG. 1 schematically depicts a view in radial section of a tyre according to a first embodiment of the invention and denoted by the general reference 10. The tyre 10 substantially exhibits revolution about an axis substantially parallel to the axial direction X. The tyre 10 is in this case intended for a passenger vehicle.

The tyre 10 comprises a crown 12 comprising a crown reinforcement 14 comprising a working reinforcement 15 comprising two working plies 16, 18 of working reinforcing elements and a hoop reinforcement 17 comprising a hooping ply 19 of hooping reinforcing elements. The crown reinforcement 14 is surmounted by a tread 20 arranged radially on the outside of the crown reinforcement 14. In this case, the hoop reinforcement 17, the hooping ply 19, is radially interposed between the working reinforcement 15 and the tread 20.

The tyre also comprises two sidewalls 22 extending the crown 12 radially inwards. The tyre 10 also has two beads 24 radially on the inside of the sidewalls 22, each having an annular reinforcing structure 26, in this case a bead wire 28, surmounted by a mass of filling rubber 30 on the bead wire, and also a radial carcass reinforcement 32.

The carcass reinforcement 32 comprises at least one carcass ply comprising several reinforcing elements, the ply being anchored in each of the beads 24 by a turn-up around the bead wire 28, so as to form, in each bead 24, a main strand 38 extending from the beads through the sidewalls towards the crown 12, and a turn-up strand 40, the radially outer end 42 of the turn-up strand 40 being radially on the outside of the annular reinforcing structure 26. The carcass reinforcement 32 thus extends from the beads 24 through the sidewalls 22 and into the crown 12. The carcass reinforcement 32 is arranged radially on the inside of the crown reinforcement 14 and of the hoop reinforcement 17. The carcass reinforcement 32 comprises a single carcass ply 34.

The tyre 10 also comprises an airtight inner liner 43, preferably made of butyl, axially on the inside of the sidewalls 22 and radially on the inside of the crown reinforcement 14 and extending between the two beads 24.

Each working ply 16, 18, hooping ply 19 and carcass ply 34 comprises a polymeric composition, in which reinforcing elements of the corresponding ply are embedded. Each polymer composition, here an elastomer composition, of the working plies 16, 18, hooping ply 19 and carcass ply 34 is made from a conventional composition for the skim coating of reinforcing elements conventionally comprising a diene elastomer, for example natural rubber, a reinforcing filler, for example carbon black and/or silica, a crosslinking system, for example a vulcanization system, preferably comprising sulfur, stearic acid and zinc oxide, and possibly a vulcanization accelerator and/or retarder and/or various additives.

Example of a Composite According to the Invention

Figure 2:
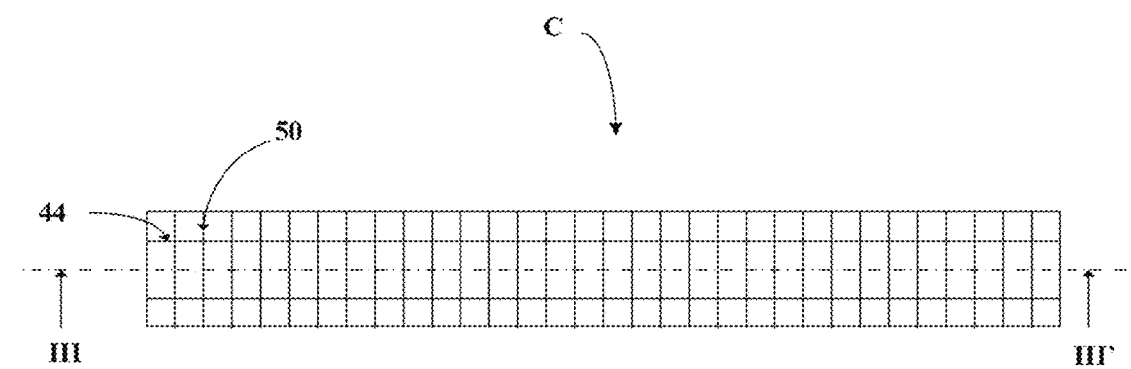
FIG. 2 illustrates a composite C for obtaining a hooping ply of the tyre of FIG. 1.

A composite from which the hooping ply 19 is obtained will now be described with reference to FIGS. 2, 3 and 4.

The composite comprises a fabric T comprising textile warp reinforcing elements 44 and weft reinforcing elements 50 embedded in an elastomer composition. The warp reinforcing elements 44 are substantially parallel to one another and extend in a general warp direction Dwp and the weft reinforcing elements 50 are substantially parallel to one another and extend in a general direction referred to as weft direction Dwt different from the general warp direction Dwp. The general weft direction Dwt and the general warp direction Dwp forming an angle greater than or equal to 45°, preferably ranging from 80° to 110° and here equal to 90°.

Example of a Fabric According to the Invention

Figure 5:
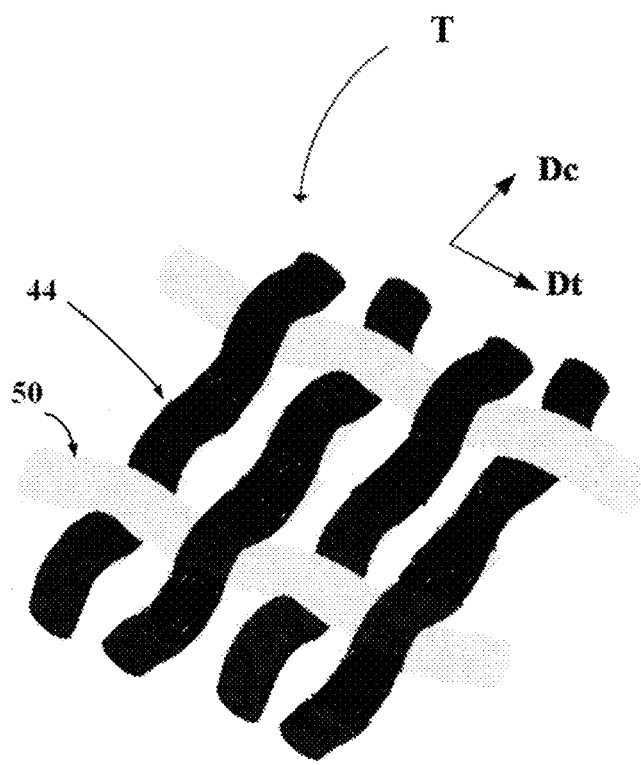
FIG. 5 is a detail view of a fabric according to the invention.

The fabric T will be described below with reference to FIG. 5.

The weft reinforcing elements 50 interweave the warp reinforcing elements 44.

The moisture regain of the weft reinforcing elements 50 is less than or equal to 2.0%. In this case, it is 1.8%.

Figure 6:
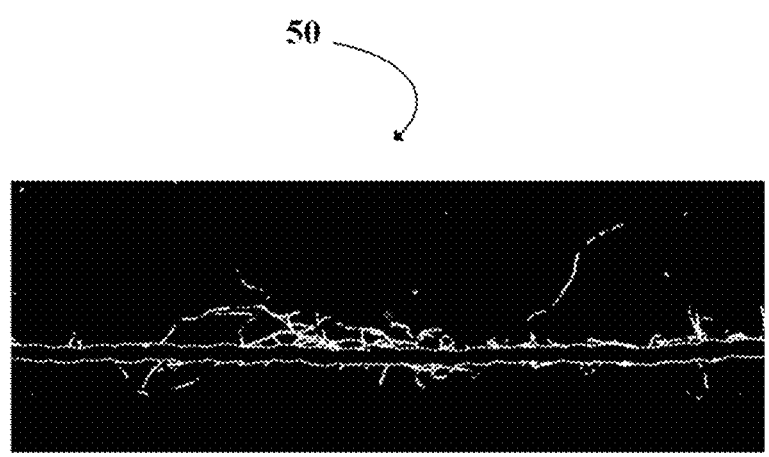
FIG. 6 is an enlargement of a weft reinforcing element 50 according to the invention.

The weft reinforcing elements 50 are hairy as shown in FIG. 6. The weft reinforcing elements 50 are such that the number of threadlike elements protruding from the diameter of the weft reinforcing element 50 is greater than or equal to 1250 threadlike elements per 100 metres of weft reinforcement, preferably greater than or equal to 5000 threadlike elements per 100 metres of weft reinforcing elements and more preferentially greater than or equal to 7500 threadlike elements per 100 metres of weft reinforcing elements. In this case, it is 8750 threadlike elements per 100 metres of weft reinforcing elements 50.

The warp and weft reinforcing elements will be described below.

Nature of the Strands of Each Warp and Weft Reinforcing Element

Figure 3:
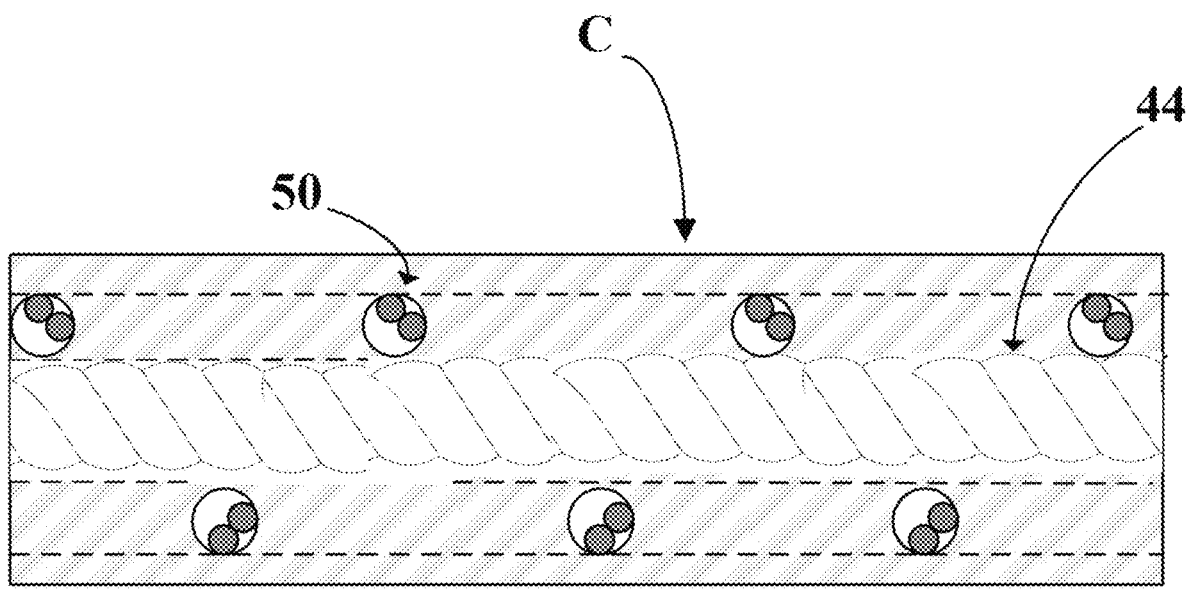
FIG. 3 illustrates a cross-sectional view along the plane III-III' of the composite C of FIG. 2.
Figure 4:
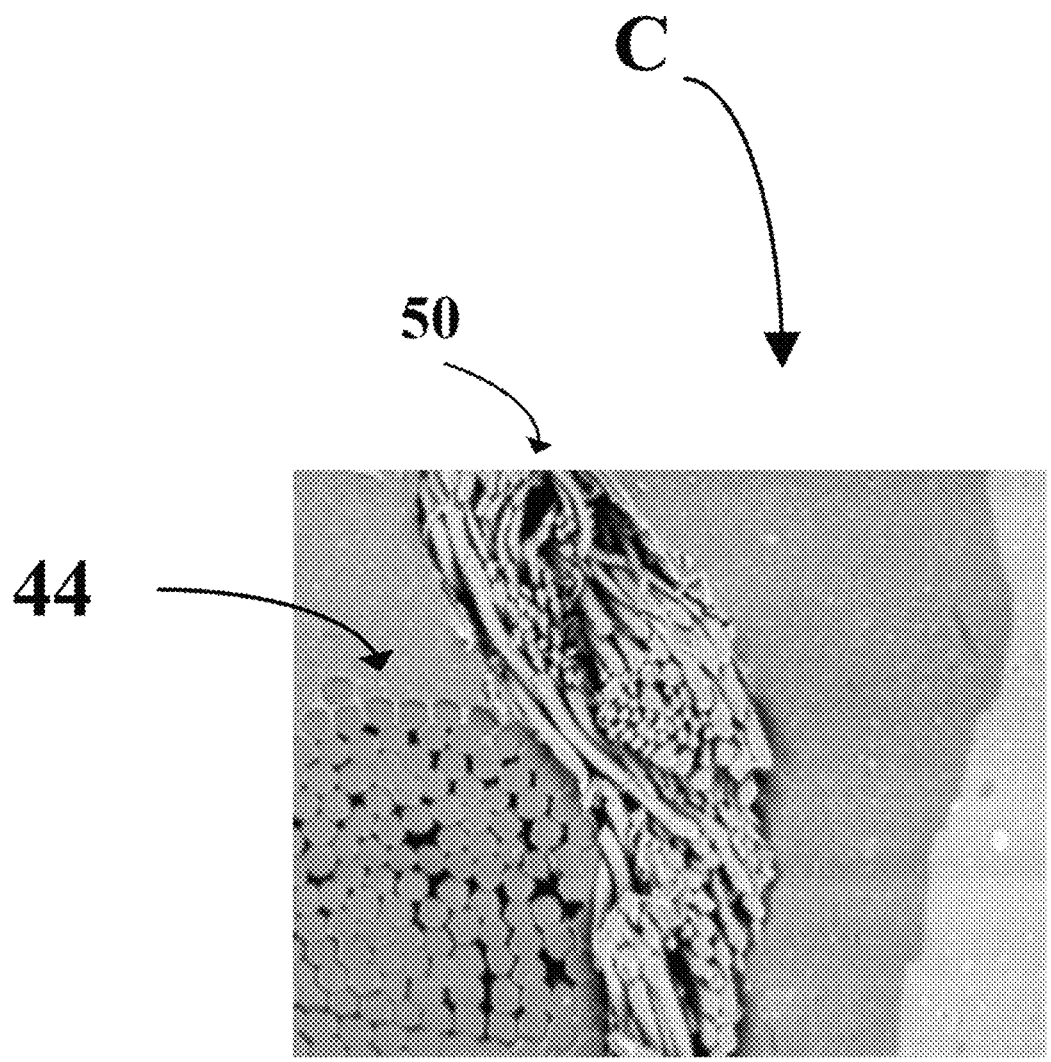
FIG. 4 an enlargement of the composite C according to the invention.

As depicted schematically in FIG. 3, each warp reinforcing element 44 comprises several multifilament strands and comprises an assembly consisting of two multifilament strands made of aromatic polyamide, the two strands being wound in a helix around one another. In this case, the aliphatic polyamide is Nylon 6,6. Each warp reinforcing element is twist-balanced. For the sake of the accuracy of the description, FIG. 4 is a cross-sectional view of the warp reinforcing element 44, in which the filaments of each of the strands can be seen.

Each weft reinforcing element 50 comprises, for at least 50% of its weight, one or more textile filaments and/or several textile fibres and preferably consists of one or more textile filaments and/or several textile fibres. As depicted in FIG. 6, each weft reinforcing element 50 comprises at least one strand comprising a core and a layer coating the core, the core comprising at least one filament and the layer comprising several protruding short fibres. In this case, each weft reinforcing element consists of an assembly of two strands comprising a core and a layer coating the core, the core comprising at least one filament and the layer comprising several short fibres that protrude and go back in.

The core comprises several synthetic organic polymeric filaments and the layer comprises several synthetic organic polymeric fibres. Here, each filament and each fibre are chosen from polyester filaments and fibres.

Count of Each Warp and Weft Reinforcing Element

The count of the aliphatic polyamide multifilament strand of the warp reinforcing element ranges from 80 to 120 tex, preferably from 90 to 110 tex, and more preferentially from 90 to 100 tex. In this case, the count of each aliphatic polyimide multifilament strand of the warp reinforcing element is 94 tex.

the sum of the counts of the strands of weft reinforcing elements 50 is strictly less than 40 tex, preferably less than or equal to 30 tex and is greater than or equal to 2 tex and preferably greater than or equal to 4 tex. In this case, the sum of the counts of the strands of the weft reinforcing elements 50 is equal to 22 tex.

The count of each strand of weft reinforcing element 50 ranges from 1 to 20 tex and preferably from 10 to 15 tex. Here, it is 11 tex.

Twist of Each Warp and Weft Reinforcing Element

The twist of each warp reinforcing element 44 ranges from 100 to 500 turns per metre, preferably from 250 to 390 turns per metre and even more preferentially from 250 to 380 turns per metre. In this case, it is equal to 320 turns per metre.

The warp reinforcing elements 44 comprise an assembly consisting of two aliphatic polyamide strands, the two strands being wound in a helix around one another with a twist of 320 turns per metre and the reinforcing element is twist-balanced.

The twist of each weft reinforcing element 50 ranges from 250 to 1500 turns per metre, preferably from 500 to 1300 turns per metre, more preferentially from 900 to 1200 turns per metre. In this case, the twist of each weft reinforcing element 50 is 1100 turns per metre.

The weft reinforcing elements 50 comprise an assembly consisting of two strands of 11 tex wound in a helix around one another with a twist of 1100 turns per metre and the weft reinforcing element 50 is twist-balanced.

Density of the Weft Reinforcing Elements in the Fabric

The density of the weft reinforcing elements 50 ranges from 3.0 to 8.0 weft reinforcing elements per dm of fabric T, preferably from 3.0 to 6.0 weft reinforcing elements per dm of fabric T and more preferentially from 3.0 to 5.5 weft reinforcing elements per dm of fabric T. In this case, the density of the weft reinforcing elements 50 is equal to 5.0 weft reinforcing elements per dm of fabric T.

Diameter of the Weft Reinforcing Elements

The diameter of the weft reinforcing elements 50 is strictly less than 0.50 mm and preferably less than or equal to 0.23 mm. In this case it is 0.19 mm.

Process for Manufacturing the Fabric According to the Invention

Figure 7:
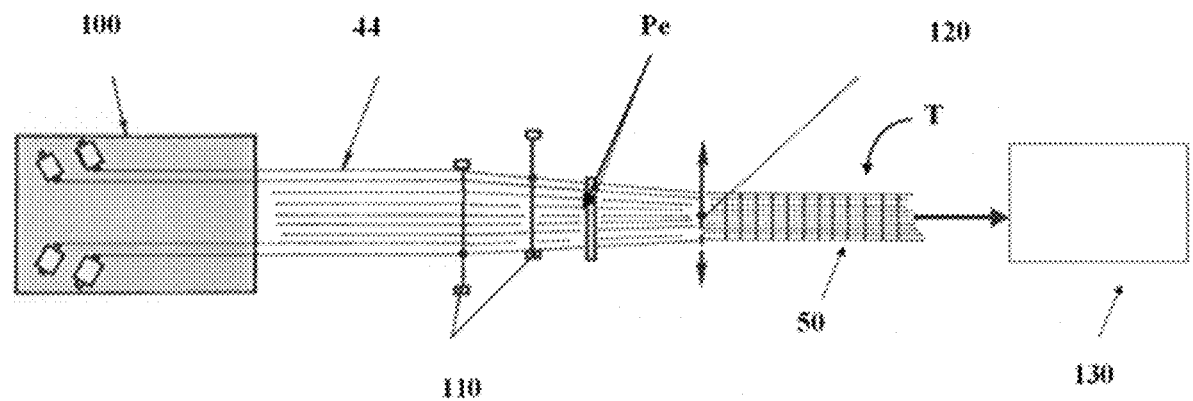
FIG. 7 is an illustration of a weaving process according to the invention.

The process for manufacturing the weft fabric T will now be described with reference to FIG. 7. In an unwinding step 100, several warp reinforcing elements 44 are unwound on an air-jet loom; in a separation step 110, the warp reinforcing elements 44 are separated into a first and a second ply of warp reinforcing elements, in an interweaving step 120, the weft reinforcing elements 50 are alternately interwoven with the warp reinforcing elements 44 of the first ply of warp reinforcing elements then of the second ply of warp reinforcing elements and in a winding step 130, the weft fabric T is wound on a storage reel; wherein the moisture regain of the weft reinforcing elements 50 is 1.8% and wherein the weft reinforcing elements 50 are hairy.

In this case, the air-jet loom used is a Dornier A1 air-jet machine.

In a step 140, the weft fabric T is impregnated with an adhesive composition, for example, an adhesive composition of the RFL (Resorcinol-Formaldehyde-Latex) type, and the fabric T undergoes heat treatment steps in order to at least partially crosslink the adhesive composition.

Process for Manufacturing the Composite According to the Invention

Each composite C is manufactured by embedding the fabric T in the elastomer composition, for example by skim coating. During such a skim coating step, which is well known to those skilled in the art, the fabric T is moved along, and two strips made of an elastomer composition, and referred to as skims, are brought in, one on each side of the reinforcing elements, so that the reinforcing elements are sandwiched between the two skims. The fabric is thus embedded in the elastomer composition.

Process for Manufacturing the Tyre According to the Invention

The method for manufacturing the tyre is the one conventionally used by those skilled in the art. During this process and as already previously described, various plies and composites are successively laid, during a first series of assembly steps. The blank thus obtained is then shaped. Next, other plies and composites intended to form the crown 12 of the tyre 10 are laid, including the composite according to the invention intended to form the hooping ply 19 of the tyre 10. Finally, the blank thus obtained is vulcanized in order to obtain the tyre 10.

Measurements and Comparative Tests

Table 1 summarizes the characteristics and the process for manufacturing a fabric from the prior art, comparative fabrics TC1 and TC2 and a fabric T and T' according to the invention. The measurement of the hairiness according to the first method is indicated in the "Hairiness method 1" table and the measurement of the hairiness according to the second method is indicated in the "Hairiness method 2" table.

TABLE 1

| Fabric | TEDT | TC1 | TC2 | T | T' | T" |
|---|---|---|---|---|---|---|
| Nature of the warp strands/number of strands | Nylon/2 | Nylon/2 | Nylon/2 | Nylon/2 | Nylon/2 | Nylon/2 |
| Twist of the warp strands (t/m) | 250/250 | 320/320 | 320/320 | 320/320 | 320/320 | 320/320 |
| Count of the warp strands (tex) | 140/140 | 94/94 | 94/94 | 94/94 | 94/94 | 94/94 |
| Nature of the weft strands/number of strands | Cotton/1 | Cotton/1 | PET/1 | PET/2 | PET/1 | PET/2 |
| Twist of the weft strands (t/m) | 750 | 750 | 750 | 1100/1100 | 750 | 750/750 |
| Count of the weft strands (tex) | 30 | 30 | 28 | 11/11 | 21 | 10/10 |
| MR (%) | 8.0 | 8.0 | 0.9 | 1.8 | 0.6 | 0.5 |
| Hairiness method 1 | >12500 | >12500 | 0 | 8750 | 3800 | 3882 |
| Hairiness method 2 | 17756 | 17756 | 0 | 16190 | 7431 | 9676 |
| Weft diameter (mm) | 0.23 | 0.23 | 0.19 | 0.19 | 0.18 | 0.20 |
| Air-jet loom weaving | yes | yes | no | yes | yes | yes |
| Composite | CEDT | C1 | C2 | C | C' | C" |
| Weft strand density (yarns/dm) | 5.5 | 5.5 | — | 5.0 | 5.0 | 5.0 |

It is noted that the comparative fabric TC2 is not weavable via an air-jet weaving process. Thus no composite can be obtained. The fabrics T, T' and T" according to the invention are weavable.

The capillary capacity of the weft reinforcing elements coated with an adhesive composition was compared using a tension meter which makes it possible to measure changes in weight over time when the reinforcing element is in contact with a liquid. It is then possible to obtain several pieces of information:

measurement of the weight as a function of time on reinforcing elements (capillary action);
  measurement of the contact angle to determine the affinity of the material of the reinforcing element and a liquid, here water; and
  measurement of the surface tension of the water.

Figure 8:
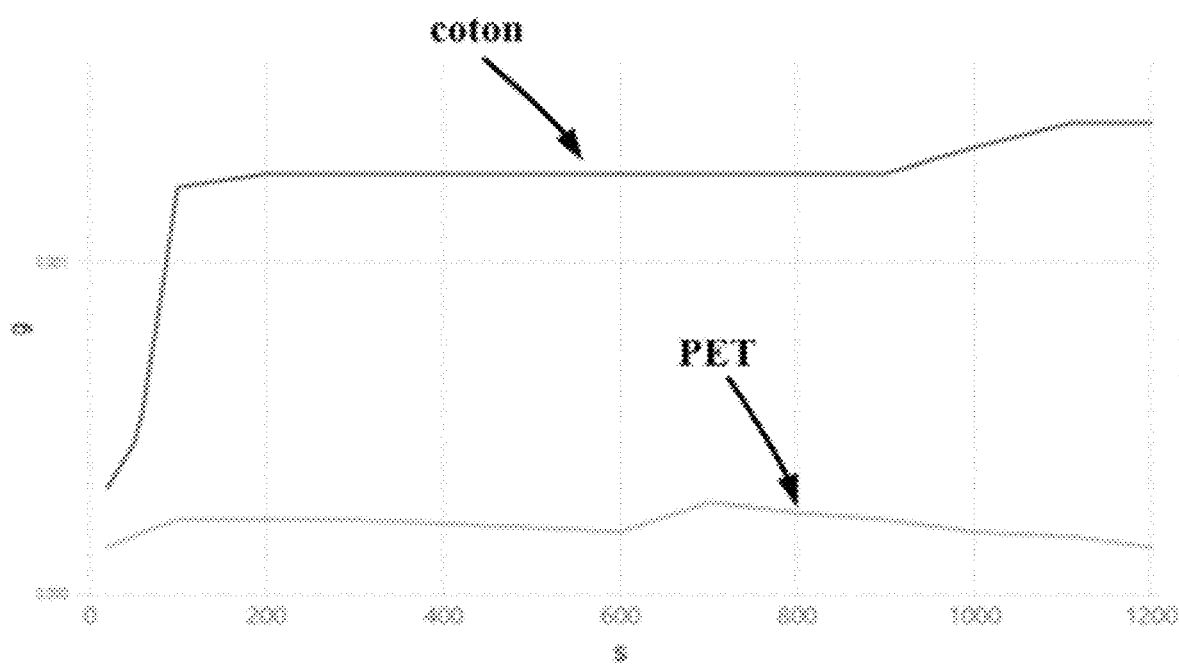
FIG. 8 illustrates curves of capillary action of the weft reinforcing element 50 of the weft fabric T and of the weft reinforcing element of the fabric TEDT.

FIG. 8 shows the curve of the change in weight, in grams, of the reinforcing element sized with an adhesive composition based on phloroglucinol and terephthaldehyde as a function of the time in seconds when the reinforcer is soaked in water. This curve is representative of what happens in the weft fabric when it comes into contact with water. It is observed that the weft reinforcing element 50 made of PET sized with an adhesive composition used in the weft fabric T according to the invention takes up 10 times less water compared with the weft reinforcing element made of cotton used in the weft fabric TEDT. It is also observed that the weft reinforcing element 50 made of PET used in the weft fabric T according to the invention absorbs very little water from the start and that the content thereof increases very little over time.

This test clearly demonstrates the hypothesis of the inventors that by selecting a weft reinforcing element having a low moisture regain, the spread of water in the textile reinforcers is reduced and thus the spread of corrosive agents which oxidize the metal reinforcing elements of the crown reinforcement is reduced.

The behaviour of the weft reinforcing elements sized with an adhesive composition used in the weft fabrics T' and T" according to the invention soaked in water is identical to that of the reinforcing element 50 of the weft fabric T: they absorb very little water from the start and the content thereof increases very little over time.

Comparison of the Tyres

The tyre 10 according to the invention was compared with tyres PEDT from the prior art and control tyres P1 each respectively comprising a composite C, CEDT and C1 obtained from the fabrics T, TEDT and TC1 respectively.

The tyres and in particular their corrosion resistance were compared using the corrosion test described below: the tyres are run on a stony road in salt water for 5000 kilometres. The total surface area of oxidation pockets on the shoulders of the tyres, i.e. the locations where there is contact between the textile reinforcing elements and the metal cords of the crown ply, and therefore the surface areas where there is corrosion via the spread of water by the hooping ply, is measured.

The results are collated in Table 2 below.

Table 2 shows the corrosion resistances of the tyres tested. A very poor corrosion resistance is indicated by the sign "--" and a poor corrosion resistance is indicated by the sign "-". A good corrosion resistance is indicated by the sign "+". A very good corrosion resistance is indicated by the sign "++".

TABLE 2

| Tyre | PEDT | P1 | 10 |
|---|---|---|---|
| Corrosion resistance | − | − | ++ |

Thus, it is noted that the tyre 10 according to the invention has a corrosion resistance performance better than that of the tyre from the prior art PEDT and the comparative tyre P1.

The invention is not limited to the above-described embodiments.

It will also be possible to combine the features of the various embodiments and alternative embodiments described or contemplated above, provided that these features are compatible with one another.

The invention claimed is:

1. A weft fabric for tires comprising several textile warp reinforcing elements and several weft reinforcing elements,
    wherein a moisture regain MR of the weft reinforcing elements is less than or equal to 2.0%, the moisture regain MR being determined according to standard ASTM D 885/D 885MA of January 2010,
    wherein the weft reinforcing elements interweave the warp reinforcing elements, and
    wherein the weft reinforcing elements are hairy.

2. The weft fabric according to claim 1, wherein the weft reinforcing elements are such that a number of threadlike elements protruding from a diameter of each weft reinforcing element is greater than or equal to 1250 threadlike elements per 100 meters of weft reinforcing elements, the number of protruding threadlike elements being determined according to a first method of measuring hairiness in which any threadlike element crossing a line perpendicular to a tangent to an external diameter of each weft reinforcing element in a direction of a length of each weft reinforcing element is counted.

3. The weft fabric according to claim 1, wherein the weft reinforcing elements are such that a number of 1 to 2 mm threadlike elements protruding from a diameter of each weft reinforcing element is greater than or equal to 5000 threadlike elements per 100 meters of weft reinforcing elements, the number of protruding threadlike elements being determined according to a second method of measuring hairiness in which a number of threadlike elements protruding from the diameter of each weft reinforcing element which have a size of between 1 and 2 mm if a line is plotted perpendicular to a tangent to an external diameter of each weft reinforcing element in a direction of a length of each weft reinforcing element are measured.

4. The weft fabric according to claim 1, wherein the warp reinforcing elements are substantially parallel to one another and extend in a general warp direction and the weft reinforcing elements are substantially parallel to one another and extend in a general weft direction different from the general warp direction.

5. The weft fabric according to claim 1, wherein each textile warp reinforcing element comprises several multifilament strands.

6. The weft fabric according to claim 5, wherein each warp reinforcing element comprises an assembly consisting of two multifilament strands, the two strands being wound in a helix around one another.

7. The weft fabric according to claim 1, wherein each weft reinforcing element comprises, for at least 50% of its weight, one or more textile filaments and/or several textile fibers.

8. The weft fabric according to claim 1, wherein each weft reinforcing element comprises at least one strand comprising a core and a layer coating the core, the core comprising at least one filament and the layer comprising several protruding short fibers.

9. The weft fabric according to claim 8, wherein the core comprises several synthetic organic polymeric filaments and the layer comprises several synthetic organic polymeric fibers.

10. The weft fabric according to claim 9, wherein each filament and/or each fiber is selected from polyester filaments and fibers, polyamide filaments and fibers, polyketone filaments and fibers, polyurethane filaments and fibers, acrylic filaments and fibers, polyolefin filaments and fibers, polyether ether ketone filaments and fibers and assemblies thereof.

11. The weft fabric according to claim 1, wherein a diameter of each weft reinforcing element is strictly less than 0.50 mm.

12. The weft fabric according to claim 1, wherein a density of the weft reinforcing elements ranges from 3.0 to 8.0 weft reinforcing elements per dm of fabric.

13. An elastomer composite for tires comprising at least one weft fabric according to claim 1 embedded in an elastomer composition.

14. A tire comprising a hoop reinforcement comprising at least one hooping ply, wherein the at least one hooping ply comprises the elastomer composite according to claim 13.

15. A process for manufacturing a weft fabric comprising the steps of:
- in an unwinding step, unwinding several warp reinforcing elements from a creel on an air-jet loom;
- in a separation step, separating the warp reinforcing elements into a first and a second ply of warp reinforcing elements;
- in an interweaving step, alternately interweaving at least one weft reinforcing element with warp reinforcing elements of the first ply of warp reinforcing elements, then of the second ply of warp reinforcing elements; and
- in a winding step, winding the weft fabric on a storage reel,
- wherein a moisture regain MR of the weft reinforcing elements is less than or equal to 2.0%,
- wherein the moisture regain MR is determined according to standard ASTM D 885/D 885MA of January 2010, and
- wherein the weft reinforcing elements are hairy.

\* \* \* \* \*